United States Patent [19]

Warren

[11] Patent Number: 4,766,013

[45] Date of Patent: Aug. 23, 1988

[54] CARBON COMPOSITE ARTICLE AND METHOD OF MAKING SAME

[75] Inventor: James W. Warren, Pacoima, Calif.

[73] Assignee: Refractory Composites, Inc., Whittier, Calif.

[21] Appl. No.: 617,262

[22] Filed: Jun. 4, 1984

Related U.S. Application Data

[63] Continuation of Ser. No. 475,521, Mar. 15, 1983, which is a continuation-in-part of Ser. No. 273,953, Jun. 15, 1981.

[51] Int. Cl.$^4$ .............................................. B05D 3/02
[52] U.S. Cl. ................................... 427/228; 423/447.1; 427/249; 427/250; 427/255.2; 427/255.7; 428/367; 428/408
[58] Field of Search ..................... 423/447.1; 427/228, 427/244, 250, 243, 245, 255.1, 255.2, 255.7; 428/367, 408

[56] References Cited

U.S. PATENT DOCUMENTS

| | | | |
|---|---|---|---|
| 4,271,372 | 6/1981 | Geldner et al. | 428/408 |
| 4,321,298 | 3/1982 | Shaffer et al. | 428/408 |
| 4,425,407 | 1/1984 | Galasso et al. | 428/408 |

Primary Examiner—Peter A. Nelson
Attorney, Agent, or Firm—Ellsworth R. Roston; Charles H. Schwartz

[57] ABSTRACT

A composite structural ceramic article and method of fabrication thereof. The article of the invention is specifically designed for use in high temperature, corrosive and erosive environments such as those found in heat engines, heat exchangers, stationary power equipments and industrial process equipments. The article comprises a porous carbon fibrous substrate or other suitable high temperature fibrous substrate which may include: a pyrolytic carbon or appropriate chemical vapor deposited sheath formed about each fiber of the substrate; a chemically vapor deposited metallic carbide, oxide, boride or nitride coating over the coated fibers of the substrate; and an impermeable metallic carbide, oxide, boride or nitride outer protective layer formed about the entire periphery of the coated substrate. In accordance with the method of the invention, the metallic coating is applied to the fibers in such a manner such that internal porosity of the article is precisely controlled and a flaw resistant, tough, non-catastrophic failing structural ceramic body is formed.

91 Claims, 2 Drawing Sheets

CARBON COMPOSITE ARTICLE AND METHOD OF MAKING SAME

This is a continuation of application Ser. No. 475,521, filed Mar. 15, 1983, which is in turn a continuation-in-part of application Ser. No. 273,953, filed June 15, 1981.

FIELD OF THE INVENTION

The present invention relates generally to fibrous ceramic matrix composite articles and the method of making same. More particularly the invention relates to unique carbon-silicon composite articles for use in high temperature, hostile fuild environment.

DISCUSSION OF THE PRIOR ART

The potential of ceramics as structural materials for advanced engineering materials applications has been recognized for many years. Advantages of ceramics and ceramic matrix composites include the following: high strength/weight ratio; high stiffness/weight ratio; tailorable properties and geometry; high temperature strength; resistant to thermal shock, impact, corrosion/erosion and fatigue.

Experimental attempts to successfully demonstrate ceramic hardware, however, have not be completely successful due to flaw sensitivity, brittleness and catastrophic failure of the materials. In addition, other factors that have impeded utilization of advanced ceramic composites include: lack of proper designs and experience; thermal shock sensitivity; poor reproducibility, reliability; low impact strength; and high cost.

Recent research efforts have improved materials and design methods. However, a more thorough and deeper understanding of their variations and behavior is urgently required if ceramics are to be successfully utilized in the near term time frame. Unfortunately, the predominance of available ceramic materials only represent solutions looking for problems through substitution rationales rather than attacking their limitations directly. Current flaw sensitive, brittle failure mechanisms will have to be replaced by tough, high fracture energy materials whose failure mode is more forgiving and predictable.

The only presently known methods of achieving practical high performance ceramic material systems is to introduce cohesive elements or barriers to crack propagation into a ceramic composite structure in the form of discrete particles or fibers; in other words, form a ceramic matrix composite. With such materials it is then possible to use an architectural approach to application design/material selection; identified operational requirements can then be matched with state-of-the-art materials and processes. Required work includes establishing specific performance and production criteria, careful design analysis and a goal-oriented, iterative materials development effort.

State-of-the-art automotive gas turbines presently require an additional 500° F. above their normal operating temperature to allow for acceleration of the rotating components. The use of ceramics for rotor and power train construction reduces mass and inertia by at least 50%, thereby reducing the acceleration over-temperature requirement to only 250° F. available for steady state operation. This one-step improvement is equal to turbine operating temperature increases achieved through the past twenty-five years of metallurgical development.

Such potential achievements realistically lie within the state-of-the-art of the technologies involved. However, intrinsic material properties and limitations have to be recognized and utilized within the design goal parameters. Raw materials, fabrication and processing technologies have to be interfaced with the designer and equipment operator to provide goal-oriented materials/component/system development with prototype demonstration providing iterative feedback necessary to assure success.

Typically all material strengths drop off as temperatures increase. Since these rates of decrease, however, are not the same it provides designers with latitude in materials selection. The selection of materials for use at operating temperatures above 2000° F. is quite limited and even at 2500° F. silicon nitride and silicon carbide are on the down scope of their strength curve. On the other hand, carbon and its composites exhibit an equal or increase in strength from room temperature to more than 4000° F.

Typical properties of carbon/carbon composites, which are brittle fiber/brittle matrix ceramic systems, are sufficient to meet most identified application requirements. They are tough and somewhat forgiving materials and data shows that although microcracking does occur at load levels below ultimate failure, subsequent loading to equal or lesser stress levels will not propagate these cracks. Fatigue life is almost infinite.

A typicaly application for structural carbon/carbon composite materials is found in aircraft brakes where the composite provides friction, heat sink and structural capabilities. Carbon/carbon composite brake systems are currently operational on F-14, F-16, Space Shuttle, and Concorde aircraft. Individual wheel sets are also under evaluation in commercial service on all heavy lift aircraft-747, DC10, L-1011, and Airbus.

MATERIAL STATUS

In applying the theory of fracture mechanics to the thermal shock resistance of brittle materials, Rossi & Hasselman in their paper entitled "Application of Fracture-Mechanics Theory to the Thermal Shock Resistance of Brittle Materials" describe the values of increasing the surface fracture energy of a ceramic through the use of fiber reinforcing. Recent developments in graphite fiber reinforced carbon, silicon/silicon carbide and glass matrix composite systems have demonstrated viability in achieving this increase in surface fracture energy while allowing economical production of high strength intermediate/high temperature hardware that can be tailored to meet application requirements.

Efforts with glass reinforced glass, tantalum reinforced silicon nitride and graphite/silicon carbide reinforced glass have shown that high strength, impact resistant, tough composite components can be readily fabricated. Additional prior art efforts have shown that fibrous reinforced, net dimension ceramic composites can be produced free of pore sensitivity.

The introduction of tantalum fibers with a silicon nitride matrix was successful in increasing the Charpy impact strength of the composite from one half foot pound to three and one half foot pounds before any cracking occurred. Using graphite fibers in a glass matrix system demonstrated properties approximately equaling those of graphite epoxy at room termperature and even higher strengths at 550° C.

While it is well known that no chemical bonds exist in carbon/carbon systems, it is interesting to note that brittleness in these ceramic matrix compoisite systems appears to be a function of the fiber to matrix bond strength. In all cases, poor fiber to matrix bonds produce tough composites while good fiber to matrix bonds result in brittle, flaw sensitive materials.

Graphite fiber reinforced silicon/silicon carbide composite systems offer a unique potential of minimizing, if not overcoming many of the limitations of monolithic ceramics. There are, however, a myriad of approaches which involve fiber type and precursor as well as fiber volume, fabrication technique, thermal and CVD processing parameters and the effect of the related variables that might be used in solving these problems. These approaches are based upon existing experience and manufacturing capabilities in carbon/carbon composite technology presently used for commercial aircarft brakes and a wide variety of thermostructural aerospace applications.

The fiber reinforced composite is also suitable as a substrate for CVD silicon carbide; parts have been coated, recoated and satisfactorily machined with relative ease following coating. Additional applications under investigation for these systems are semiconductor diffusion furnace tubes, advanced non-nuclear power system components, chemical process and fossil fuel power generating equipment and hardware for geothermal systems.

Flexural strengths of up to 120,000 PSI have been reported for carbon/silicon/silicon carbide material and early results with low fiber volume, low strength (approximately 10,000 PSI) radial turbine rotors show promise. A three inch radial turbine wheel with an integral shaft fabricated from a carbone/silicon/silicon carbide composite system was successfully spun at 50,000 RPM and 2,000° F. During its seven and one half hours of cyclical operation, seven starts and stops, including two flame-outs were experienced prior to test termination resulting from loss of tip clearance. Tip loss was caused by ingestion of foreign matter which adhered to the shroud and removed 5/16" of the blade tips while the rotor was operating at speed and temperature. Uniquely, and most importantly, this impact damage did not shatter the rotor or cause catastrophic failure; the turbine simply lost power due to loss of tip clearance and was shut down normally.

Flaw sensitivity and brittleness are intrinsic limitations of monolithic ceramics which do not appear subject of simple solutions. Because of these limitations, successful utilization of ceramics in structural applications will require a change in the basic failure mechanism of these materials as discussed in previous paragraphs. Flaw sensitive, brittle fracture—typical of monolithic ceramics—results in catastrophic failure such as when a rock hits a pane of glass. Such a failure must be changed to a tough or tearing mechanism where an orderly disruption of individual materials in the system fail on a microstructural basis resulting in no catastrophy such as experienced when hitting a piece of plywood with a hammer. This type of impact resistance and lack of catastrophic failure is typical of most fiber reinforced resin systems and can also be made available in ceramic matrix systems.

Carbon, glass and hybrid carbon/silicon/silicon carbide/silicon nitride composite systems have exhibited substantial improvements in toughness and lack the flaw sensitivity so common in monolithic ceramics. Specific combinations of fibers, matrices and processing must be utilized to meet identified application requirements. Fiber selection, volume fraction and orientation coupled with matrix selection and processing technology can be varied over wide ranges thus providing designers with a degree of freedom to match application requirements that were previously unavailable.

For the reasons previously discussed, great difficulty has been experienced in reproducability and reliably manufacturing ceramic articles suitable for structural applications. One solution to the prior art difficulties is described in the co-pending application of the present inventor, Ser. No. 62,401. The present invention comprises an improvement upon the methods and articles described in said co-pending application.

As will be appreciated from the discussion which follows, the process of the present invention overcomes the prior art problems of monolithic ceramic flaw sensitivity, brittleness and catastrophic failure and provides a unique, tough, non-flaw sensitive fibrous ceramic matrix composite article which will result thermal shock/stress and can be reproducably, reliably and economically fabricated to net dimention.

SUMMARY OF THE INVENTION

It is an object of the present invention to provide a unique composite article adapted for use in highly corrosive, erosive environments comprising a fiberous substrate, a metallic carbide, oxide or nitride compliant coating over the fibers of the substrate and an impermeable metallic carbide, oxide or nitride outer protective layer or seal coat formed about the periphery of the coated substrate.

It is another object of the invention to provide a composite article of the aforementioned character which will substantially maintain its dimensional stability and strength even under severe high temperature oxidizing conditions.

It is another object of the invention to provide a composite article of the class described which is substantially resistant to corrosion and erosion by high temperature, hostile gas, particulate and fluid environments.

It is an important object of the present invention to provide a composite article of the character described in the preceeding paragraphs in which the aforementioned metallic carbide, oxide, boride or nitride coating is controllably applied to the carbon fibrous substrate in a manner such that any mechanical stresses built up in the substrate due to mismatches in coefficients of thermal expansion between the fiberous substrate and the coatings are effectively accommodated or relieved.

It is another particularly important object of the present invention to provide a structural composite article of the character as described in the preceeding paragraphs in which the aforementioned metallic carbide, oxide, boride or nitride coating is controllably applied to the carbon fiberous substrate in a manner such that any flaws or defects other than gross delaminations or inclusions will not initiate nor contribute to the propagation of microcracking which results in ultimate part failure; the part will have high fracture toughness and not subject to brittle failure typical of monolithic ceramics i.e. glass; and that ultimate failure is a tearing non-catastrophic failure where an orderly disruption of individual materials in the system fail on a progressive microstructural basis.

It is a further important object of the present invention to provide a process for making composite articles of the character described in the preceeding paragraphs in which the metallic carbide, oxide, boride or nitride coating is controllably applied to the carbon fibrous substrate in a manner such that the individual fibers of the substrate are free to move relative to the applied coating.

More particularly, it is an object of the invention to provide a process as described in the previous paragraph in which a pyrolytic carbon coating is first deposited by chemical vapor deposition (CVD) about each of the fibers in such a manner that each fiber is substantially encased in a non-adherent pyrolytic carbon casing and then a metallic carbide, oxide, or nitride coating is applied over the caoted fibers in such a manner that the fibers remain freely movable relative to the applied coatings.

It is another object of the invention to provide a composite article as described in the previous paragraph in which each fiber of the substrate is encased in a uniform CVD type carbon casing to promote superior load transfer from fiber to fiber when the article is stressed. This CVD carbon casing also provides a mechanical interface for increasing the surface fracture energy of the composite structure thus resulting substantial toughness and flaw resistance.

It is still another object of the invention to provide a process of the aforementioned character in which, following the coating of the fibers, an impermeable carbide, nitride, boride or oxide coating is controllably formed about the fibers and entire periphery of the substrate to seal it against hostile environments.

In summary, these and other objects of the invention are realized by a composite article produced by a method comprising the steps of forming a starting substrate of selected fiber/pore volume fractions and pore structure from a multiplicity of high temperature fibers such as carbon selected from a group consisting of pyrolyzed wool, rayon, polyacrylonitrile and pitch fibers; suspending the starting substrate within a first controlled environment; forming an intermediate substrate by heating the starting substrate to a temperature of between approximately 1500° F. and approximately 2200° F. while exposing the starting substrate to a hydrocarbon gas to form a uniform layer of pyrolytic carbon about each of the fibers in the starting substrate; removing the intermediate substrate from said first controlled environment and forming it into shaped substrate having the approximate shape desired of the end product composite article; supporting the shaped substrate in a second controlled environment while heating it to a temperature of between approximately 1350° F. and approximately 2500° F. while exposing the intermediate substrate to a gas containing carbon and silicon such as trichlorosilane to form a uniform layer of CVD silicon carbide about each of the fibers/fiber bundles in either the starting or intermediate substrate.

DISCUSSION OF THE PREFERRED EMBODIMENTS

Figure 1:
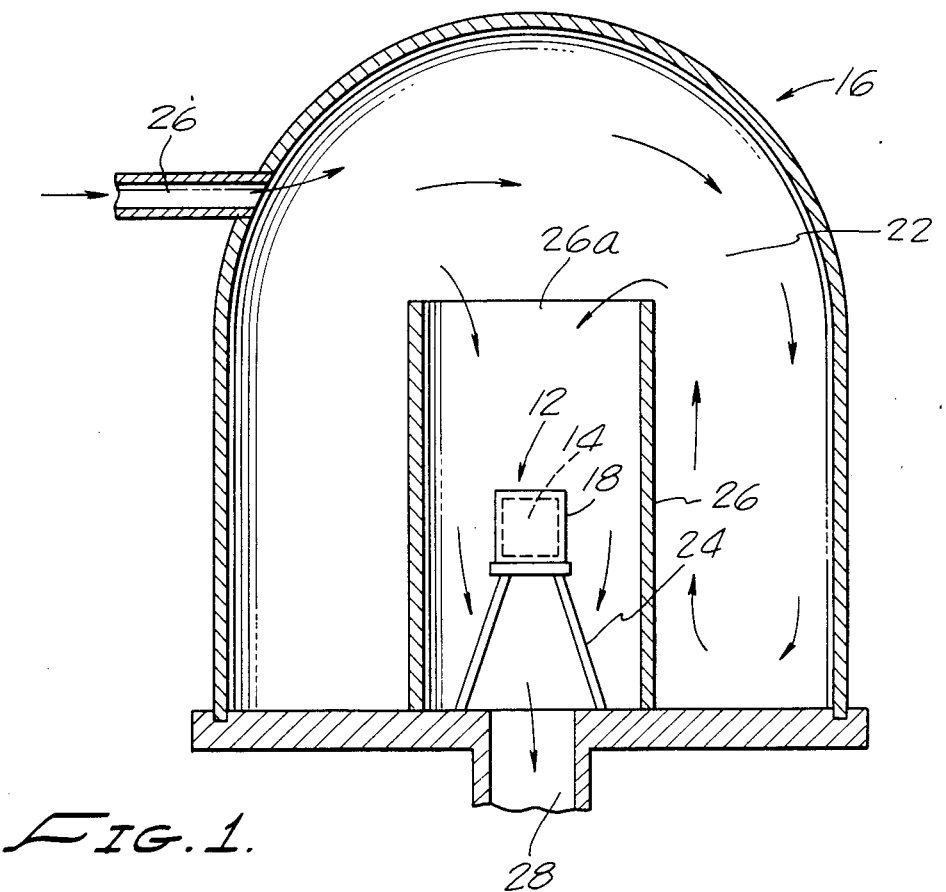
FIG. 1 is a side elevational view of one form of controlled environment in which the substrate may be infiltrated and coated.

Before proceeding with a detailed dicussion of the preferred embodiments of the present invention, the following definitions of the technical terms used herein are presented to facilitate a clear understanding of the nature and scope of the invention:
1. Composite product - a product comprising a carbon, graphite or ceramic substrate and one or more metallic carbide, oxide, boride or nitride coatings within or over the substrate material.
2. Starting or basic substrate - as used herein, the starting substrate or interim product shape before the application of a metallic coating.
3. Carbon fibrous substrate - a starting substrate comprising carbon material in fibrous form.
4. Fiber volume - volume % of carbon fibers present in the given substrate.
5. Non-woven - coherent fibrous material formed without interlacing of threads, such as batting or felt.
6. Woven - fabric formed by interlacing warp and filling threads on a loom, or the like.
7. Ceramic - metallic or other inorganic oxides, carbides, borides or nitrides generally classed as glass-forming oxides.
8. Pyrolytic or "CVD" material - a material made from the thermal decomposition of a gas containing the material.

Stated in simple terms, the composite article of the invention consists of a two or more phase system comprising a basic substrate of carbon fibrous and/or ceramic materials, a metallic carbide, oxide, boride or nitride layer over the fibers and matrix of the substrate and an impermeable carbide, oxide, boride or nitride protective layer formed over the entire periphery of the infiltrated substrate. An important feature of the article is the absence of a strong bond between the fibers and the matrix system to reduce flaw sensitivity, increase surface fracture energy (toughness) and to accommodate the mismatch in expansion coefficient between the fibrous substrate and the carbide, oxide, boride or nitride protective and seal coat layers.

The articles of the invention are well suited for a variety of applications including turbine rotors, turbine augmentor divergent flaps and Diesel engine pre-combustion chambers made up of a carbon fiber, carbon (resin and/or pitch char and/or CVD deposit) matrix component which has been preformed to a selected component net goemetry. Each of the substrate fibers is encased in a non-adherent, uniform, CVD type carbon case so as to promote good load transfer from fiber to fiber when the article is stressed. This also provides a mechanical interface for increasing the surface fracture enengy of the composite structure, thus resulting in greater toughness and flaw resistance.

Because carbon/carbon composites actively react with oxygen when heated to temperatures in excess of 300° C., the fibers, matrix and interstices of the article are coated with a metallic carbide, oxide, boride or nitride to form a continuous CVD carbide, oxide, boride or nitride case around each of the fibers. This treatment effectively imparts increased load transfer from fiber to fiber and protects the interstices of the substrate from oxidation. The lack of bond between the fiber and the carbon and the carbide, oxide, boride or nitride case, however, allows the carbon fibers and multi-phase matrix case to move independent of one another on a microscopic scale, thus overcoming flaw sensitivity and catastrophic failure, increasing surface fracture energy (toughness) and providing a compliance mechanism that effectively reduces thermally induced mechanical stresses. The appearance of the coated fibers is clearly illustrated in FIGS. 2 and 3 of the drawings.

The article of this interim state with its substrate and concentric layers of carbon and/or metal carbide, oxide, boride or nitride remains quite porous. Therefore, to increase strength and to provide complete protection for use in high temperature oxidizing environments, subsequent infiltration of the porous substrate is controlled to deposit a thicker CVD metallic carbide, oxide, boride or nitride on the more deeply located fibers than on those near the surface. This effectively overcomes decreasing density gradients currently experienced with pyrolytic carbon infiltration. Following this an impermeable CVD metal carbide, oxide, boride or nitride is applied to seal the surface with a material whose expansion coefficient is compatable with that of the infiltration coating. The final article thus formed is remarkably stable and highly corrosion resistant even in extreme environments.

Referrring briefly to FIG. 1 of the drawings, one form of article made by the method of the invention is there illustrated. This article 12, which is a test specimen, comprises a central section 14 made up of carbon felt, chopped fiber or macerated material. In FIG. 1 the test specimen is shown positioned within a processing apparatus 16, the details of which will presently be described.

Surrounding the central section 14 is a material layer 18 comprising a woven carbon fibrous material such as carbon or graphite cloth commercially available from The Union Carbide Company and others.

In a manner which will be described in greater detail in the paragraphs which follow, the individual fibers of the central section 14 material layer 18 are coated with a layer, or sheath, of CVD carbon and then with a layer of metal carbide oxide, boride or nitride. Finally, the entire surface of the test specimen is sealed with an outer layer of CVD metal carbide, oxide, boride or nitride which extends about the entire periphery of the article.

Figure 2:
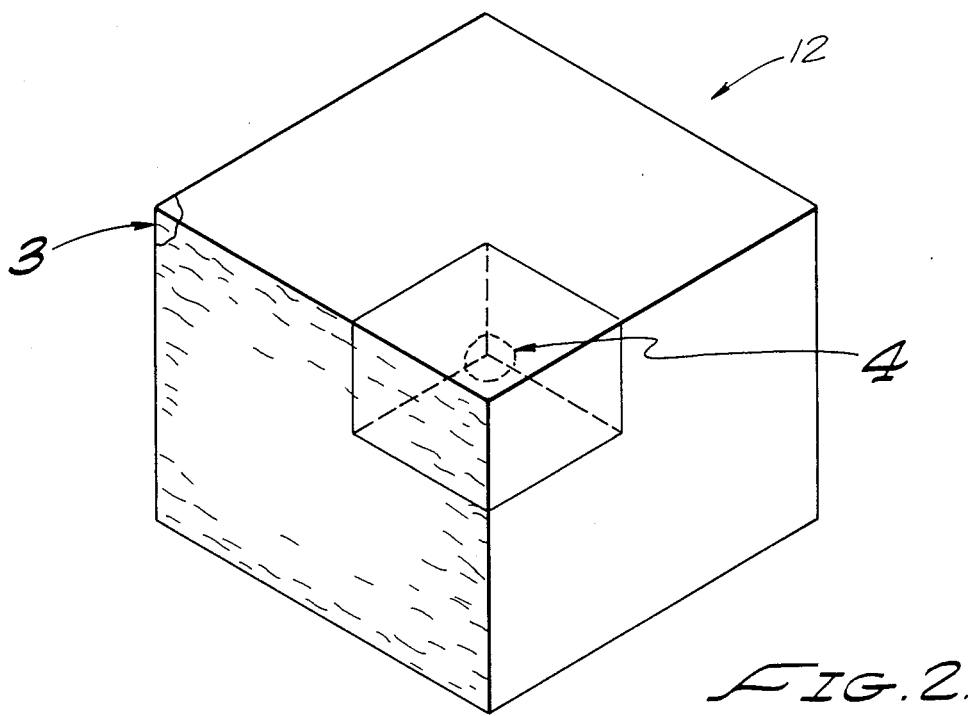
FIG. 2 is a generally diagramatic view of a substrate showing diagramatically the locations within the substrate at which the specimens shown in FIGS. 3 and 4 were taken.
Figure 3:
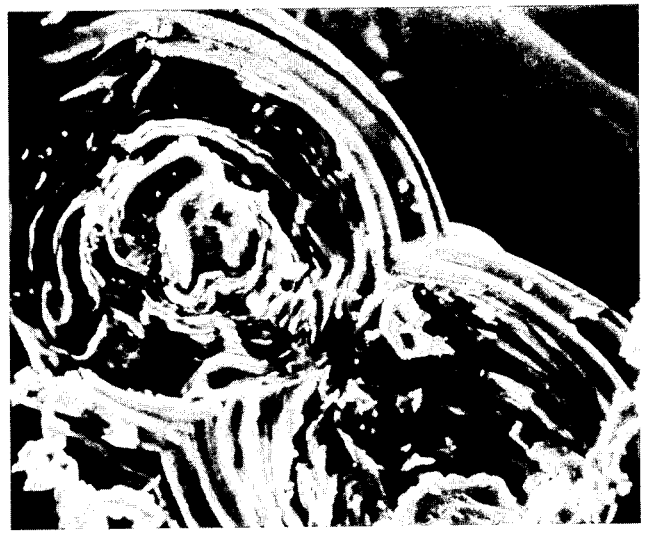
FIG. 3 is a reproduction of a photomicrograph (2000×) taken at the edge of the substrate showing the appearance of the coated fibrous substrate at an intermediate density level and prior to the application of the final seal coat.
Figure 4:
FIG. 4 is similar to FIG. 3 showing a reproduction of a photomicrograph (2000×) taken at the center of the substrate and taken at the same intermediate processing stage.

Referring to FIGS. 2 through 4, the character of the coated substrate material 14 and 18 is there vividly illustrated. FIG. 3 is a reproduction of a photomicrograph of the coated fibrous material at 2000 times magnification. In this Figure the fiber, the CVD coating about the fiber and the metal coating superimposed thereupon, are clearly visible. Also in this Figure the ends of the individual fibers can clearly be seen protruding from the CVD carbon coating and the metal coating, in this case, metal carbide. A coating of metal oxide, boride or nitride would have a similar appearance. As will be appreciated from the examples which follow, the metal coating, be it an oxide, boride, nitride or a carbide, is applied to the fibers in a manner such that any mechanical stresses built up in the substrate due to a mismatch between the coefficients of thermal expansion of the fibrous substrate and the coating are effectively accommodated. This important feature of the present invention is clearly illustrated in FIGS. 3 and 4 of the drawings.

It is to be appreciated that the article shown in FIGS. 2 through 4 of the drawings is merely exemplary of the type of article which can be made in accordance with the method of the present invention. Highly useful products of the invention include turbine rotors, diesel engine combustion chambers, and numerous specially designed products for nuclear and aerospace applications.

As will be clearly illustrated by the examples which follow, the method of the invention stated in simple terms comprises the following steps: First, a multiplicity of high temperature fibers such as carbon fibers are assembled into a basic or starting substrate. This starting substrate is then heated to about 1000° F. to about 3000° F. in a controlled environment to thermally stabalize the substrate. Next the starting substrate is placed in a first controlled enviroment, heated to between about 1500° F. and about 4200° F. and exposed to a carbonaceous gas such as methane. During this step a uniform layer of CVD carbon is deposited about each of the fibers of the substrate. Following this step the interim substrate thus formed is machined or otherwise formed into the approximate shape of the end product. Next the shaped substrate formed in the previously described step is placed in a second controlled environment and heated to about 1350° F. to about 2500° F. The heated shaped substrate is then exposed to a gas containing carbon and a metal, for example, silicon such as trichlorosilane for a period of time sufficient to form a uniform layer of CVD silicon carbide about each of the fibers/fiber bundles in either the starting or intermediate substrate. Other metals which can be deposited through chemical vapor deposition can also be used to form a metal coating selected from a group consisting of metal carbide, metal oxide, metal boride and metal nitride. Next the article thus formed is once again heated to a temperature of about 1800° F. to about 3200° F. in a third controlled environment and exposed to a gas containing carbon and silicon such as trichlorosilane. This step forms a uniform CVD seal coating of silicon carbide of controllable porosity about the entire periphery of the article.

EXAMPLE NO. 1

Using carbonized rayon felt as a starting material, a starting substrate was constructed. In this instance the starting substrate was approximately 4 inches wide, 8 inches long and about 1 inch thick. The density of the substrate was on the order of 0.1 gm/cc and the fiber volume was about 7%. Next, the starting substrate, along with several control specimens, was heated to about 1000° F. to about 2000° F. for a period of time sufficient to thermally stabalize the substrate. The thermally stabilized substrate was then placed into a first vacuum-pressure controlled environment, which in this case was a vacuum chemical vapor deposition furnace of conventional design. The temperature of the substrate was then raised to about 1800° F. while a vacuum of on the order of 15 mm Hg was maintained within the deposition chamber. A secondary, or intermediate, substrate was formed by controllably flowing methane gas interstitially of the substrate for a period of time of about 100 hours. Through this technique a uniform layer of pyrolytic carbon was deposited about each of the fibers within the substrate to form an intermediate substrate having a density of on the order of 1.0 gm/cc.

Following the aforementioned infiltration step, the intermediate substrate was cooled, removed from the vacuum furnace and transferred to a machining area. In the machining area the intermediate substrate was machined in a conventional manner to form a shaped substrate. In this instance the shaped substrate was constructed in the configuration of a net dimension turbine augmentor divergent flap test section approximately 4 inches wide by 6 inches long by ½ inch thick.

Following the machining step, the divergent flap section, or shaped substrate was supported in a vacuum chamber, or second controlled environment as shown in FIG. 1. The shaped substrate was then heated to about 1800° F. in a mild vacuum. With the substrate at this elevated temperature a gas containing carbon and silicon was allowed to fill the chamber 22 to between 0.1 and 0.6 atmospheres. Following this back fill with a carbon and silicon containing gas the pressure of the chamber was then reduced ot the original mild vacuum and this process repeated for a period of time of about fifty hours. In the second controlled environment the article 12 is supported upon a pedestal 24 disposed with a housing 26 which is open at its upper end 26a. With this arrangement a gas flow is achieved as depicted by the arrows of FIG. 1 with the gas entering at 26 and exhausting at 28.

Next, the coated article thus formed was cooled, removed from the vacuum chamber and transferred to an inspection area. This inspection revealed that the diffusion coated article exhibited the dimensions of the shaped substrate within plus 0.0005 to 0.001 inches. Visual inspection of the control specimens which had been similarly processed showed the carbon fibers to be essentially unaffected by the methane or silane treatment. Importantly, no strong bond was found to exist between the carbon fibers and the silicon carbide coating formed by coating the shaped substrate with the silicon carbide. In all cases no strong chemical or diffusion bonds were observed to exist between the fiber and/or matrix system. Accordingly, the fibers were free to move at a different rate from the carbon and/or silicon carbide matrix systems. This highly novel and important feature of the diffusion coated article of the present invention effectively minimizes any residual stresses tending to occur within the article. Furthermore, it provides an effective matrix system which permits the fibers to carry the load and be transferred from fiber to fiber through a continuous matrix irrespective of voids or other incipent flaws created by fiber spacing, crossover discontinuities or inclusions. By comparison, a monolithic ceramic body processed in a comparable fashion to that just described would continue to exhibit significant flaw sensitivity. This residual intrinsic flaw sensitivity of monolithic ceramics results from an intimate intergranular bond which provides no means of inhibiting crack growth or decreasing surface fracture energy. Although adherent CVD overcoating tends to nullify the effects of surface defects, internal flaws and subcritical crack growth can result in extensive microcracking and subsequent catastrpohic failure of the component.

Following dimensional inspection of the infiltrated article, it was placed into a third controlled environment, or vacuum chemical vapor deposition furnace. Once in place within the CVD apparatus, the article was heated to about 1800° F. and a gas containing dimethyl-dichlorosilane was controllably passed over and about the article. Due to the porous nature of the starting or pyrolytic carbon coated article formed by the novel method of the present invention, a uniform coating of CVD silicon carbide was deposited over the coated fibers of the article. This step provided an impermeable coating of silicon carbide over the fibers and interstices of the entire starting or intermediate substrate rendering it virtually impervious to corrosion and erosion caused by high temperatures and exposure to hostile gas and fluid environments. Subsequent testing and evaluation of the two phase CVD layer type coated article thus formed under extremely hostile environments showed it to be highly stable and remarkably resistant to flaw sensitivity, brittleness, catastrophic failure or thermally induced cracking, crazing or spalling.

EXAMPLE NO. 2

In constructing the starting substrate of this example chopped fibers of carbonized polyacrylonitrile were used. This substrate was also about 4 inches wide, 8 inches long and about 1 inch thick. The fiber volume of the substrate was on the order of 35%.

The starting substrate was placed into a vacuum furnace and the fibers thereof coated with pyrolytic carbon in the manner described in Example No. 1. However, propane was used in lieu of methane as the carbonaceous gas.

After infiltration the substrate was removed from the CVD furnace and was machined into a shaped substrate in the manner of Example No. 1.

Following machining, the intermediate substrate was heated to about 1800° F. in a second controlled environment maintained at slightly greater than atmospheric pressure and a CVD silicon carbide coating was deposited on the pyrolytic carbon coated fibers.

The silicon coated article thus formed was dimensionally inspected and returned to the vacuum furnace wherein it was once again heated to about 1800° F. While being maintained at this elevated temperature a gas containing carbon and silicon, as for example trimethyl-chlorosilane was passed over and about the article to deposit a uniform coating of silicon carbide over the coated fibers and about the periphery of the article. The article thus formed was observed to have a small by measurable degree of open porosity.

As a final step the metal coated article was sealed by introducing a metal oxide into the pores of the metal coated article. While the metal oxide in this example was in the form of fine particulate matter, the final coating could be accomplished by various methods including CVD, liquid spray or emmersion.

Rigorous testing of the article showed it to be dimensionally stable and resistant to flaw sensitivity, brittleness, catastrophic failure, cracking, crazing and spalling even in hostile gas environments and at high temperatures.

EXAMPLE NO. 3

A carbonized rayon cloth made up of interwoven carbon fibers was cut into circular shaped pieces having a diameter of about 4 inches. A disc shaped starting substrate was constructed by stacking a plurality of the circular shaped pieces onto a base plate of a compression fixture. Each layer of cloth was rotated slightly with respect to the preceeding layer and a top plate was placed over the assembly and bolted to the base plate. The assembly was then compressed to bring the cloth layers into intimate contact. The starting substrate thus formed exhibited a fiber volume of about 35% and a fiber density of about 1.4 gm/cc.

Next the starting substrate, along with the compression fixture, was placed into a CVD vacuum furnace and in the manner previously described, pyrolytic carbon was uniformly deposited over each of the fibers comprising the disc shaped starting substrate.

The intermediate substrate thus formed was removed from the compression fixture and machined to form a disc about 3½ inches in diameter and about 1 inch thick.

Following machining, the substrate was returned to the CVD vacuum furnace and heated to a termperature of about 1800° F. A gas containing methyltrichlorosilane was repeatedly passed over and about the shaped substrate for a period of time of about 50 hours to form a diffusion coated article in which a silicon carbide coating was formed about each of the coated fibers of the intermediate substrate. The temperature of the substrate was intermittently raised to about 2700° F. to effect dimensional stability between the silicon carbide/pyrolytic carbon and the substrate.

After undergoing another dimensional inspection, the still porous, diffusion coated article was returned to the vacuum furnace for final coating with methyltrichlorosilane in the manner described in Example No. 1. Once again the two phase coated article thus formed exhibited remarkable stability and durability during severe environmental testing.

EXAMPLE NO. 4

Using a tape material made up of closely woven, carbonized PAN fibers, a cylindrical shaped starting substrate was constructed by wrapping the tape about a mandrel. This substrate exhibited density of about 0.83 gm/cc and a fiber volume of about 40%.

This substrate was machined and then coated with silicon nitride as in Example No. 1 but using a dichlorosilane gas to form a diffusion coated substrate.

Finally the diffusion coated article thus formed was coated with a seal coat of silicon nitride by heating it under vacuum to a temperature of on the order of 1800° F. and exposing it to a gas containing silicon and nitrogen as for example silicon chloride and nitrogen. This final step formed a uniform CVD coating of silicon nitride over the coated fibers and the periphery of the article rendering it virtually impervious to corrosion and erosion caused by high temperatures and exposure to hostile fluids.

EXAMPLE NO. 5

In constructing the starting substrate of this example the starting material used was a macerated material comprising a multiplicity of randomly oriented pyrolyzed wool fibers. This starting material was formed into a substrate which was approximately 4 inches wide, 8 inches long and about 1 inch thick, and exhibited a fiber density of on the order of 35%. The starting substrate was processed in the manner described in Example No. 1 except that methytrichlorosilane was used in applying the diffusion and final coating to the diffusion coated article.

EXAMPLE NO. 6

Using a macerated material having a multiplicity of chopped pitch fibers a starting substrate which exhibited a fiber volume of about 60% was also processed as described in Example No. 1 save that silicon tetrachloride and methane were used in the diffusion and final coating steps.

As previously discussed herein, one form of the method of the invention involves encasing the substrate fibers in a CVD type carbon case. This encasement tends to promote good load transfer from fiber to fiber.

It has been found that good load transfer characteristics can also be achieved by encasing the substrate fibers in one or more casings of silicon carbide. This can be accomplished by controllably flowing a gas such as dimethyldichloride or methyltrichlorosiline interstitially of the thermally stabilized substrate so as to form a uniform layer of pyrolytic silicon carbide about each of the fibers within the substrate.

It has also been found that for certain applications the starting substrate can advantageously be formed from a slurry comprising a granular material such as silicon carbide or graphite. For other applications the slurry can comprise such a granular material intermixed with short lengths of high temperature resistant fibers selected from the group consisting of ceramic, pyrolyzed wool, rayon, polyacrylonitrile and pitch. The slurry may also include a suitable carbonaceous binder such as petroleum pitch, coal tar pitch, furan resins and phenolic resins.

The examples which follow illustrate the various forms of the method of the invention discussed in the immediately preceding paragraphs.

EXAMPLE NO. 7

Short lengths of rayon fibers were mixed with a suitable binder such as phenolic resin to form a slurry. The slurry was then vacuum formed into a formed substrate of the desired size and shape. The starting substrate was then produced by drying the formed substrate and carbonizing it at approximately 1200° C. Next the starting substrate, along with several control specimens, was heated to about 1000° F. to about 2300° F. for a period of time sufficient to thermally stabilize the substrate. The thermally stabilized substrate was then placed into a first vacuum-pressure controlled environment, which in this case was a vacuum chemical vapor deposition furnace of conventional design. The temperature of the substrate was then raised to about 1600°–2200° F. while a vacuum of on the order of 0.1 to 0.6 atmospheres was maintained within the deposition chamber. A secondary, or intermediate, substrate was formed by controllably flowing methylchlorosilane gas interstitially of the substrate for a period of time of about 20 hours. Through this technique a uniform layer of pyrolytic silicon carbide was deposited about each of the fibers within the substrate to form an intermediate substrate having a density of on the order of 1.0 gm/cc.

Following the aforementioned infiltration step, the intermediate substrate was cooled, removed from the vacuum furnace and transferred to a machining area. In the machining area the intermediate substrate was machined in a conventional manner to form a shaped substrate of a desired configuration.

Following the machining step, the shaped substrate was suported in a vacuum chamber, of second controlled environment as shown in FIG. 1. The shaped substrate was then heated to about 1600°-2200° F. in a mild vacuum. With the substrate at this elevated tempeature a gas containing carbon and silicon was allowed to fill the chamber 22 to between 0.1 and 0.6 atmospheres. Following this back fill with a carbon and silicon containing gas the pressure of the chamber was then reduced to the original mild vacuum and this process repeated for a period of time of about fifty hours.

Next the coated article thus formed was cooled, removed from the vacuum chamber and transferred to an inspection area. This inspection revealed that no strong bond was found to exist between the carbon fibers and the silicon carbide coating formed by coating the starting and shaped substrates with the silicon carbide. In all cases no strong chemical or diffusion bonds were observed to exist between the fiber and/or matrix system. Accordingly, the fibers were free to move at a different rate from the carbon and/or silicon carbide matrix systems. This highly novel and important feature of the diffusion coated article of the present invention effectively minimizes any residual stresses tending to occur within the article. Furthermore, it provides an effective matrix system which permits the fibers to carry the load and be transferred from fiber to fiber through a continuous matrix irrespective of voids or other incipient flaws created by fiber spacing, crossover discontinuities or inclusions.

Following dimensional inspection of the infiltrated article, it was placed into a third controlled enviroment, or vacuum chemical vapor deposition furnace. Once in place within the CVD apparatus, the article was heated to about 1800° F. and a gas containing dimethyl dichlorosilane was controllably passed over and about the article. Due to the porous nature of the starting or pyrolytic silicon carbide coated article formed by the novel method of the present invention, a uniform coating of CVD silicon carbide was deposited over the coated fibers of the article. This step provided an impermeable coating of silicon carbide over the fibers and interstices of the entire starting or intermediate substrate rendering it virtually impervious to corrosion and erosion caused by high temperatures and exposure to hostile gas and fluid environments. Subsequent testing and evaluation of the two phase CVD layer type coated article thus formed under extremely hostile environments showed it to be highly stable and remarkably resistant to flow sensitivity, brittleness, catastrophic failure or thermally induced cracking, crazing or spalling.

EXAMPLE NO. 8

In this example the slurry used to form the starting substrate comprised short lengths of PAN fibers intermixed with silicon carbide in granular form. The slurry was vacuum formed into the desired shape and was then dried and carbonized at between 1220° and 1500° C.

The starting substrate thus formed was placed into a vacuum furnace and the fibers thereof coated with pyrolytic silicon carbide in the manner described in Example No. 7. However, dimethyldichlorosilane was used in lieu of methyltrichlorosilane as the silicon bearing gas.

After infiltration the substrate was removed from the CVD furnace and was machined into a shaped substrate in the manner of Example No. 7.

Following machining, the intermediate substrate was heated to about 1800° F. in a second controlled environment maintained at slightly greater than atmospheric pressure and a CVD silicon carbide coating was deposited on the pyrolytic silicon carbide coated fibers.

The silicon coated article thus formed was dimensionally inspected and returned to the vacuum furnace wherein it was once again heated to about 1900° F. While being maintained at this elevated temperature a gas containing carbon and silicon, as for example trimethyl-chlorosilane was passed over and about the article to deposit a uniform coating of silicon carbide over the coated fibers and about the periphery of the article. The article thus formed was observed to have a small but measurable degree of open porosity.

As a final step the metal coated article was sealed by introducing a metal oxide into the pores of the metal coated article. While the metal oxide in this example was in the form of fine particulate matter, the final coating could be accomplished by various methods including CVD, liquid spray or immersion.

EXAMPLE NO. 9

In this example the starting substrate was constructed by molding granular graphite into a desired size and shape. The porous substrate thus formed was then carbonized and placed into a vacuum furnace where it was infiltrated with methylchlorosilane in accordance with the method of Example 7. In this way, a pyrolytic silicon carbide was deposited in and around the substrate to form an intermediate substrate.

Following the machining of the intermediate substrate processing of the part was completed in the same manner set forth in Example No. 7.

EXAMPLE 10

In this Example, a carbonized rayon cloth made up of interwoven carbon fibers was cut into circular shaped pieces having a diameter of about 4 inches. A disc shaped starting substrate was constructed by stacking a plurality of the circular shaped pieces onto a base plate of a compression fixture. Each layer of cloth was rotated slightly with respect to the preceding layer and a top plate was placed over the assembly and bolted to the base plate. The assembly was then compressed to bring the cloth layers into intimate contact. The starting substrate thus formed exhibited a fiber volume of about 30 to 35% and a fiber density of about 1.5 gm/cc.

Next the starting substrate, along with the compression fixture, was placed into a CVD vacuum furnace and in the manner previously described, pyrolytic silicon carbide was uniformly deposited over each of the fibers comprising the disc shaped starting substrate.

The intermediate substrate thus formed was removed from the compresssion fixture and machined to form a disc about 3½ inches in diameter and about 1 inch thick.

Following machining, the substrate was returned to the CVD vacuum furnace and heated to a temperature of about 1600°-2200° F. A gas containing methyltrichlorosilane was repeatedly passed over and about the shaped substrate for a period of time of about 50 hours to form a diffusion coated article in which a silicon carbide coating was formed about each of the coated fibers of the intermediate substrate. The temperature of the substrate was intermittently raised to about 2700° F. to effect dimensional stability between the silicon carbide carbon fiber and the substrate.

After undergoing another dimensional inspection, the still porous, diffusion coated article was returned to the vacuum furnace for final coating with methyltrichlorosilane in the manner described in Example No. 7. Once again the two phase coated article thus formed exhibited remarkable stability and durability during severe environmental testing.

In summary, one basic method of the invention capable of being practiced by those skilled in the art after a study of the disclosures of Examples 7 through 10 comprises the steps of forming a staring substrate from a multiplicity of high temperature resistant fibers selected from a group consisting of ceramic, pyrolyzed wool, rayon, polyacrylonitrile and pitch fibers; exposing the starting substrate to an elevated temperature of about 1600°–2200° F. for a period of time sufficient to thermally stabilize the substrate; suspending the starting substrate within a first vacuum-pressure controlled environment; heating the starting substrate to a temperature of between approximately 1350° F. and approximately 2500° F.; and forming a coated article having a controlled degree of open porosity about the fibers of the starting substrate through chemical vapor deposition, a metal capable of reacting with carbon, oxygen, boron, silicon and nitrogen to form a carbide, oxide, boride, silicide and nitride.

By applying the silicon carbide coating to the fibers of the substrate in the manner described in the examples the fibers are uniquely free to move relative to the coatings. Accordingly the carbon-silicone composite article this produced exhibits a high degree of dimensional stability and strength even under severe high temperature oxidizing conditions.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of making a composite article comprising the steps of:
   forming a starting substrate from a multiplicity of high temperature resistant fibers selected from a group cnsisting of pyrolyzed wool, rayon, polyacrylonitrile and pitch fibers,
   exposing said starting substrate to an elevated temperature of about 1800° F. for a period of time sufficient to thermally stabilize said substrate,
   suspending said starting substrate by heating said starting substrate to a temperature of between approximately 1500° F. and approximately 4200° F. while exposing said starting substrate to a hydrocarbon gas to form a uniform layer of pyrolytic carbon about each of the fibers in said starting substrate,
   removing said intermediate substrate from said first controlled environment and forming it into a shaped substrate having the approximate shape desired of the end product composite article,
   supporting said shaped substrate in a second controlled environment while heating said shaped substrate to a temperature of between approximately 1350° F. and approximately 2500° F., and
   forming a coated article having a conmtrolled degree of open porosity by depositing about said fibers of said shaped substrate through chemical vapor deposition a metal capable of reacting with carbon, oxygen, boron and nitrogen to form a carbide, oxide, boride and nitride.

2. A method of making a composite article as defined in claim 1 including the step of removing said chemical vapor deposition coated article from said second controlled environment, placing it in a third controlled environment, and
   heating said article to a temperature of between approximately 1800° F. and approximately 3200° F., and
   exposing said article to a halide gas containing carbon and silicon selected from a group consisting of methyl trichlorosilane, dimethyldichlorosilane, silicon tetrachloride, trimethylchlorosilane, dichlorosilane, silicon dichloride, silicon tetrabromide, tribromosilane, dibromosilane and silicon dibromide to form a uniform chemical vapor deposition coating of silicon carbide over the coated fibers and periphery of said diffusion coated article.

3. A method of making a composite article as defined in claim 1 in which said chemical vapor deposition coated article is formed by placing said shaped substrate into a controlled deposition environment, continuously varying the pressure within said environment, and depositing on the fibers of said shaped substrate a coating of silicon carbide of a predetermined thickness.

4. A method of making a composite article as defined in claim 1 in which said coated article is formed by depositing said coating into said shaped substrate fabricated from silicon carbide fibers.

5. A method of making a composite article as defined in claim 1 including the step of removing said coated article from said second controlled environment and controllably introducing a metal oxide into the pores of said coated article.

6. A method of making a composite article as defined in claim 3 in which said coated article is formed by maintaining said shaped substrate in the presence of a gas containing silicon at a temperature greater than about 1700° F. to deposit a coating of silicon carbide over the coated fibers and periphery of said shaped substrate.

7. A method of making a composite article as defined in claim 1 in which said hydrocarbon gas is selected from a group consisting of methane, propane, ethane, butane, ethylene, acetylene and benzine.

8. A method of making a composite article as defined in claim 1 in which said multiplicity of carbon fibers are formed into a starting substrate having a fiber volume of between about 5% and about 65%.

9. A method of making a composite article comprising the steps of:
   forming a starting substrate from a multiplicity of high temperature resistant fibers,
   exposing said starting substrate to an elevated temperature of between about 1000° F. and about 1800° F. for a period of time of between about 1 hour and about 100 hours,
   suspending said starting substrate within a first vacuum pressure controlled environment,
   forming an intermediate substrate by heating said starting substrate to a temperature of between approximately 1500° F. and approximately 4200° F. while exposing said starting substrate to a hydrocarbon gas to form a uniform layer of pyrolytic carbon about each of the fibers in said starting substrate,
   removing said intermediate substrate from said first controlled environment and forming it into a shaped substrate having the approximate shaped desired of the end product composite article, supporting said shaped substrate in a second controlled environment while heating said shaped substrate to a temperature of between approximately 1350° F. and approximately 2500° F., forming a coated article by depositing about said fibers of said shaped substrate, through chemical vapor deposition, a silicon metal capable of reacting with carbon to form silicon carbide, removing said diffusion coated article from said second controlled environment, heating said article within a controlled environment to a temperature of between approximately 1350° F. and approximately 2500° F., and exposing said article to a gas containing carbon and silicon to form a uniform chemical vapor deposition coating of silicon carbide over the coated fibers, the fiber interstices, and the periphery of said diffusion coated article.

10. A method of making a composite article as defined in claim 9 in which the pressure within the second controlled environment is fluctuated from approximately 0.01 to 0.6 atmospheres.

11. A method of making a composite article as defined in claim 9 in which said multiplicity of high temperature resistant fibers is in the form of a felt material having a multiplicity of randomly oriented fibers.

12. A method of making a composite article as defined in claim 9 in which said multiplicity of high temperature resistant fibers is in the form of a macerated material having a multiplicity of randomly oriented fibers.

13. A method of making a composite article as defined in claim 9 in which said multiplicity of high temperature resistant fibers is in the form of a mascerated material having a multiplicity of chopped fibers.

14. A method of making a composite article as defined in claim 9 in which said multiplicity of high temperature resistant fibers is in the form of a woven material having interwoven fibers.

15. A method of making a composite article as defined in claim 9 in which said multiplicity of high temperature resistant fibers is in the form of a tape material having interwoven carbon fibers.

16. A method of making a composite article comprising the steps of:

forming a starting substrate from a multiplicity of high temperature resistant fibers in the form of a woven material having a multiplicity of interwoven fibers said fibers being selected from a group consisting of ceramic matrial, pyrolyzed wool, rayon, polyacrylonitrile and pitch fibers, suspending said starting substrate within a first controlled environment, forming an intermediate substrate by heating said starting substrate to a temperature of between approximately 1500° F. and approximately 4200° F. while exposing said starting substrate to a hydrocarbon gas selected from a group consisting of methane, propane, ethane, butane, ethylene, acetylene and benzine to form a uniform layer of pyrolytic carbon about each of the fibers in said starting substrate, removing said intermediate substrate from said first controlled environment and forming it into a shaped substrate having the approximate shape desired of the end product composite article, supporting said shaped substrate in a second controlled environment at less than atmospheric pressure while heating said shaped substrate to a temperature of between approximately 1350° F. and approximately 2500° F., forming a coated article by depositing about said fibers of said shaped substrate, through chemical vapor deposition, a metal capable of reacting with carbon, oxygen, boron and nitrogen, said metal being selected from a group consisting of silicon, boron, aluminum, magnesium, tantalum, hafnium, titanium, berillium, thorium and zirconium, removing said article from said second controlled environment and suspending it thereabove while maintaining said at a temperature of on the order of 3200° F. for about fifteen minutes, removing said coated article from said second controlled environment, heating said article within a controlled environment to a temperature of between approximately 1350° F. and approximately 2500° F., and exposing said article to a halide gas containing carbon and silicon selected from a group consisting of dimethyldichlorosilane, silicon tetrachloride trichlorosilane, dichlorosilane silicon dichloride, silicon tetrabromide, tribromosilane, dibromosilane and silicon dibromide to form a uniform chemical vapor deposition coating of silicon carbide over the coated fibers and periphery of said diffusion coated article.

17. A carbon-silicon composite article comprising a multiplicity of carbon fibers forming a shaped article, a coating of pyrolytic carbon extending over each of said fibers, a chemical vapor deposition formed coating of silicon carbide extending over each of said pyrolytic carbon coated fibers, said pyrolytic carbon coating and said silicon coating having been applied to said fibers in a manner whereby said fibers are free to move relative to said coatings.

18. A carbon-silicon composite article as defined in claim 19 in which said chemical vapor deposition formed diffusion coating consists of silicon carbide.

19. A carbon-silicon composite article as defined in claim 17 in which said chemical vapor deposition formed diffusion coating consists of silicon nitride.

20. A carbon-silicon composite article as defined in claim 17 in which said chemical vapor deposition formed diffusion coating consists of silicon oxide.

21. A carbon-silicon composite article as defined in claim 17 in which said chemical vapor deposition formed diffusion coating consists of hafnium 10 tantalum.

22. A carbon-silicon composite article as defined in claim 17 in which said chemical vapor deposition formed diffusion coating consists of titanium diboride.

23. A carbon-silicon composite article as defined in claim 17 in which said chemical vapor deposition formed diffusion coating consists of tungsten.

24. A carbon-silicon composite article as defined in claim 19 in which silicon nitride extends substantially over each of said coated fibers and substantially over the outer periphery of said article.

25. A carbon-silicon composite article as defined in claim 20 in which silicon oxide extends substantially over each of said coated fibers and substantially over the outer periphery of said article.

26. A carbon-silicon composite article as defined in claim 17 in which a coating of chemical vapor deposited silicon carbide extends substantially over each of said coated fibers and substantially over the outer periphery of said article.

27. A carbon-silicon composite article as defined in claim 17 in which the carbon fibers and silicon coating have different coefficients of thermal expansion.

28. A carbon-silicon composite article as defined in claim 17 whereby the density of said article is between 0.3 gm/cc and 4.0 gm/cc.

29. A carbon-silicon composite article as defined in claim 17 wherein said composite article is anisotropic.

30. A carbon-silicon composite article as defined in claim 17 wherein said multiplicity of carbon fibers forming the shaped article are in the form of a woven material having a multiplicity of interwoven carbon fibers.

31. A carbon-silicon composite article as defined in claim 17 wherein said multiplicity of carbon fibers forming the shape article are in the form of a felt material having a multiplicity of randomly oriented fibers.

32. A carbon-silicon composite article as defined in claim 17 wherein said multiplicity of carbon fibers forming the shaped article are in the form of a mascerated material having a multiplicity of randomly oriented fibers.

33. A carbon-silicon composite article as defined in claim 17 in which said carbon fibers forming said shaped article are pyrolyzed rayon.

34. A carbon-silicon composite article as defined in claim 17 in which said carbon fibers forming said shaped article are pyrolyzed polyacrylonitrile.

35. A carbon-silicon composite article as defined in claim 17 in which said carbon fibers forming said shaped article are wool.

36. A carbon-silicon composite article as defined in claim 17 in which said carbon fibers forming said shaped article are pitch fibers.

37. A carbon-silicon composite article as defined in claim 17 in which said carbon fibers forming said shaped article are silicon carbide.

38. A carbon-silicon composite article as defined in claim 17 in which said carbon fibers forming said shaped article are silicon nitride.

39. A carbon-silicon composite article as defined in claim 17 in which said carbon fibers forming said shaped article are boron nitride.

40. A carbon-silicon composite article as defined in claim 17 in which said carbon fibers forming said shaped article are aluminum oxide.

41. A carbon-silicon composite article as defined in claim 17 in which said carbon fibers forming said shaped article are silicon oxide.

42. A carbon-silicon composite article as defined in claim 17 in which said carbon fibers forming said shaped article are aluminosilicate.

43. A carbon-silicon composite article comprising a multiplicity of carbon fibers forming a shaped article, a coating of silicon carbide formed by chemical vapor deposition extending over each of said fibers, said silicon carbide coating having been applied to said fibers in a manner whereby said fibers are free to move relative to said coatings.

44. A carbon-silicon composite article as defined in claim 43 including a chemical vapor deposition formed coating of silicon carbide extending over each of said pyrolytic silicon carbide coatings having been applied in a manner whereby said fibers are free to move relative to both said coatings.

45. A method of making a composite article comprising the steps of:
    forming a starting substrate from a multiplicity of high temperature resistant fibers selected from a group consisting of ceramic, pyrolyzed wool, rayon, polyacrylonitrile and pitch fibers,
    exposing said starting substrate to an elevated temperature of about 1800° F. for a period of time sufficient to thermally stabilize said substrate,
    suspending said starting substrate within a controlled environment,
    heating said shaped substrate to a temperature of between approximately 1350° F. and approximately 2500° F., and
    forming a coated article having a controlled degree of open porosity by depositing about said fibers of said starting substrate through chemical vapor deposition, a metal capable of reacting with carbon, oxygen, boron, silicon and nitrogen to form a carbide, oxide, boride, silicide and nitride.

46. A method as defined in claim 45 in which said starting substrate includes granular silicon carbide intermixed with said fibers.

47. A method as defined in claim 45 in which said starting substrate includes granular graphite intermixed with said fibers.

48. A method of making a composite article comprising the steps of:
    forming a starting substrate from a granular material selected from a group consisting of silicon carbide and graphite,
    exposing said starting substrate to an elevated temperature of about 1600°-2200° F. for a period of time sufficient to thermally stabilize said substrate,
    suspending said starting substrate within a controlled environment,
    heating said shaped substrate to a temperature of between approximately 1350° F. and approximately 2500° F., and
    forming a coated article having a controlled degree of open porosity by depositing about said fibers of said starting substrate through chemical vapor deposition, a metal capable of reacting with carbon, oxygen, boron, silicon and nitrogen to form a carbide, oxide, boride, silicide and nitride.

49. In combination,
    a substrate formed from a plurality of discrete elements defining a porours relationship, the substrate having anisotropic properites and having a first coefficient of thermal expansion, and
    a matrix disposed on the substrate and having a second coefficient of thermal expansion different from the first coefficient of thermal expansion and freely movable relative to the substrate to accommodate the different coefficients of thermal expansion of the substrate and the matrix, the matrix being formed from a first material including a first element having refractory properties and a second element chemically bound to the first element.

50. The combination set forth in claim 49 wherein the discrete members in the plurality define interstices and wherein the matrix is disposed in such interstices.

51. The combination set forth in claim 49 wherein the matrix is disposed directly on the substrate.

52. The combination set forth in claim 49 wherein the matrix is permeable and an impermeable layer is disposed on the matrix.

53. The combination set forth in claim 49 wherein
the substrate is formed from discrete elements of a material containing carbon and
the matrix is formed from a material selected from the group consisting of silicon carbide, silicon nitride, silicon oxide, hafnium 10 tantalum, titanium diboride and tungsten.

54. The combination set forth in claim 39 wherein
the substrate is formed from a material selected from the group consisting of ceramic, pyrolized wool, rayon, polyacrylonitrile and pitch fibers.

55. The combination set forth in claim 54 wherein
a material selected from the group consisting of granular silicon carbide and granular graphite is mixed with the other materials in the substrate.

56. In combination,
a substrate having a first coefficient of thermal expansion and formed from a plurality of discrete elements defining a porous relationship and defining interstices between the discrete elements,
means disposed on the substrate at the interstices of the substrate for promoting a load transfer throughout the substrate, and
a matrix disposed on the promoting means at the interstices and having a second coefficient of thermal expansion different from the first coefficient of thermal expansion and freely movable relative to the substrate for providing for changes in the relative positions of the substrate and the matrix in accordance with changes in stresses on the substrate and the matrix, the matrix being formed from a material including a first element having refractory properties and a second element chemically bound to the first element.

57. The combination set forth in claim 56 wherein
the promoting means constitutes a pyrolized binder.

58. The combination set forth in claim 56 wherein
the promoting means constitutes a pyrolized carbon and
the matrix constitutes a deposition of a material selected from a group consisting of silicon carbide, silicon nitride, silicon oxide, hafnium 10 tantalum, titanium diboride and tungsten.

59. The combination set forth in claim 56 wherein
the matrix is permeable and porous and
an impermeable layer is disposed on the matrix.

60. The combination set forth in claim 56 wherein
the substrate is formed from discrete elements of a material containing carbon,
the load-distributing means is formed from pyrolized carbon and
the matrix is formed from a material selected from the group consisting of silicon carbide, silicon nitride, silicon oxide, hafnium 10, tantalum, titanium diboride and tungsten.

61. The combination set forth in claim 60 wherein
the matrix is pervious and porous and
an impermeable layer selected from a group consisting of silicon nitride, silicon carbide and silicon oxide is disposed on the matrix.

62. The combination set forth in claim 56 wherein the discrete elements have a fibrous or granular construction.

63. The combination set forth in claim 62 wherein
the substrate is formed from a material selected from the group consisting of ceramic, pyrolized wool, rayon, polyacrylonitrile and pitch fibers.

64. The combination set forth in claim 63 wherein
a material selected from the group consisting of silicon carbide and granular graphite is mixed in the substrate with the other material.

65. A method of forming a refractory composite material, including the steps of:
providing a substrate having a first coefficient of thermal expansion and formed from a plurality of discrete elements,
producing a layer of pyrolyzed material on the discrete members of the substrate, and
producing on the pyrolyzed material a chemical vapor deposition of a material having a second coefficient of thermal expansion different from the first coefficient of thermal expansion and defining a matrix freely movable relative to the pyrolyzed material and the substrate, the matrix being formed from a first element having refractory properties and providing a positive ionization and a material providing a negative ionization and bound to the first element.

66. The method set forth in claim 65 wherein
the substrate is porous and
the matrix is porous and permeable and wherein
a chemical vapor deposition having impermeable characteristics is provided on the matrix.

67. The method set forth in claim 65 wherein
the layer of the pyrolyzed material on the discrete members of the substrate is provided by:
coating a binder on the discrete elements of the substrate and
pyrolyzing the binder after such coating.

68. The method set forth in claim 67 wherein
the discrete elements in the substrate define interstices and wherein
the pyrolyzed binder is disposed at the interstices defined by the discrete elements and
the matrix is disposed on the discrete elements at the interstices.

69. The method set forth in claim 65 wherein
the layer of the pyrolyzed material on the substrate is formed by depositing the pyrolyzed material on the discrete elements of the substrate.

70. The method set forth in claim 69 wherein
the pyrolyzed material deposited on the discrete elements encase the discrete elements and
the matrix encases the pyrolyzed material.

71. The method set forth in claim 65 wherein
the chemical vapor deposition is obtained from a material selected from the group consisting of methyltrichlorosilane, dimethyl dichlorosilane, trimethylchlorosilane, dichlorosilane, silicon tetrachloride, silicon dichloride, silicon tetrabromide, triborosilane, dibromosilane and silicon dibromide.

72. The method set forth in claim 71 wherein
the pyrolized material deposited on the discrete elements is obtained from a gas selected from the group consisting of methane, propane, ethane, butane, ethylene, acetylene and benzene.

73. The method set forth in claim 68 wherein
the pyrolized binder disposed on the interstices is obtained by coating the discrete elements with a binder and pyrolizing the binder.

74. A method of forming a refractory composite material, including the steps of:
providing a substrate having a first coefficient of thermal expansion and formed from a plurality of discrete elements and having porous characteristics, disposing the substrate in a particular shape, and
producing on the substrate a chemical vapor deposition of a material having a second coefficient of thermal expansion different from the first coefficient of the thermal expansion and defining a matrix freely movable relative to the substrate, the matrix being formed from a first element having refractory properties and a second element chemically bound to the first element.

75. A method as set forth in claim 74 wherein
the chemical vapor deposition is provided with permeable characteristics and
a chemical vapor deposition of an impermeable material is produced on the pervious deposition.

76. A method as set forth in claim 74 wherein
the matrix is formed from a material selected from the group consisting of silicon carbide, silicon nitride, silicon oxide, hafnium 10, tantalum, titanium diboride and tungsten.

77. A method as set forth in claim 75 wherein
the matrix is formed from a material selected from a group consisting of silicon carbide, silicon nitride, silicon oxide, hafnium 10 tantalum, titanium diboride and tungsten and
the impermeable layer is formed from a material selected from a group consisting of silicon carbide, silicon nitride and silicon oxide.

78. The method set forth in claim 77 wherein
the chemical vapor deposition is obtained from a material selected from the group consisting of methyltrichlorosilane, dimethyl dichlorosilane, trimethylchlorosilane, dichlorosilane, silicon tetrachloride, silicon dichloride, silicon tetrabromide, triborosilane, dibromosilane and silicon dibromide.

79. A method of forming a refractory composite material, including the steps of:
providing a plurality of discrete elements in the form of a substrate, the discrete elements having a first coefficient of thermal expansion,
compressing the substrate formed from the discrete elements,
heating the substrate, and
passing gases through the heated substrate to apply to the substrate a matrix having a different coefficient of thermal expansion than that of the substrate and providing for a free movement of the matrix relative to the substrate, the matrix being formed from a first element having refractory properties and a second element chemically bound to the first element.

80. A method as set forth in claim 79 wherein
the substrate is formed with porous characteristics and
the matrix is formed with porous characteristics.

81. A method as set forth in claim 80 wherein
the substrate is shaped before the matrix is applied to the substrate.

82. A method as set forth in claim 81 wherein
the discrete elements constitute fibers disposed in an anisotropic relationship.

83. A method as set forth in claim 80 wherein
a hard, impermeable coating is applied on the matrix.

84. A method as set forth in claim 83 wherein
the discrete elements constitute grains.

85. A method as set forth in claim 80 wherein
the matrix is permeable and
the combination of the substrate and the matrix is heated and gases are passed through the heated combination of the substrate and the matrix to produce a hard, impermeable coating on the matrix.

86. A method as set forth in claim 79 wherein
a material promoting a load transfer is deposited on the substrate before the deposition of the matrix on the substrate.

87. A method as set forth in claim 86 wherein
the material promoting the load transfer is deposited by passing through the substrate a gas selected from a group consisting of methane, propane, ethane, butane, ethylene, acetylene and benzene.

88. A method as set forth in claim 87 wherein
the material promoting the load transfer encases the discrete elements and wherein the matrix is deposited by chemical vapor deposition to encase the discrete elements.

89. A method as set forth in claim 87 wherein
the material promoting the load transfer is deposited by coating the discrete elements with a binder and the binder is pyrolized.

90. A method as set forth in claim 89 wherein
the material promoting the load transfer is disposed in the interstices between the discrete elements and the matrix is deposited by chemical vapor deposition at the interstices between the discrete elements.

91. A method as set forth in claim 79 wherein
a variable pressure is applied to the gases passing through the substrate.

* * * * *